(12) United States Patent
Gorostidi Martinez de Lecea et al.

(10) Patent No.: US 10,502,180 B2
(45) Date of Patent: Dec. 10, 2019

(54) BLADE FOR A WIND TURBINE

(71) Applicant: Acciona Windpower, S.A., Sarriguren (Navarra) (ES)

(72) Inventors: Alvaro Gorostidi Martinez de Lecea, Sarriguren (ES); Carlos Donazar Moriones, Sarriguren (ES); Javier Sanz Corretge, Sarriguren (ES); Teresa Arlaban Gabeiras, Sarriguren (ES); Jose Miguel Garcia Sayes, Sarriguren (ES); Miguel Nunez Polo, Sarriguren (ES)

(73) Assignee: ACCIONA WINDPOWER, S.A., Sarriguren (Navarra) (ES)

( * ) Notice: Subject to any disclaimer, the term of this patent is extended or adjusted under 35 U.S.C. 154(b) by 238 days.

(21) Appl. No.: 15/353,191

(22) Filed: Nov. 16, 2016

(65) Prior Publication Data
US 2017/0234295 A1 Aug. 17, 2017

(30) Foreign Application Priority Data
Nov. 6, 2015 (EP) .................................. 15382547

(51) Int. Cl.
*F03D 1/06* (2006.01)
(52) U.S. Cl.
CPC .... *F03D 1/0675* (2013.01); *F05B 2240/2211* (2013.01); *F05B 2280/6003* (2013.01)
(58) Field of Classification Search
CPC .... F03D 1/0676; F03D 1/0683; F03D 1/0633; F03D 1/0641; F03D 1/0675; F05B 2280/6003; F05B 2280/6013; F05B 2240/301; Y02E 10/721
See application file for complete search history.

(56) References Cited

U.S. PATENT DOCUMENTS

| | | | |
|---|---|---|---|
| 2012/0237356 A1* | 9/2012 | Mironov | B29C 70/342 416/232 |
| 2013/0315747 A1* | 11/2013 | Schibsbye | F03D 1/0675 416/230 |
| 2014/0064980 A1* | 3/2014 | Griesel | F03D 1/0675 416/226 |
| 2017/0021575 A1* | 1/2017 | Hansen | F03D 1/0675 |
| 2017/0058867 A1* | 3/2017 | Yarbrough | F03D 1/0675 |
| 2017/0067439 A1* | 3/2017 | Yarbrough | F03D 1/0675 |
| 2017/0320275 A1* | 11/2017 | De Waal Malefijt | B29C 33/40 |

* cited by examiner

*Primary Examiner* — Dwayne J White
*Assistant Examiner* — Jackson N Gillenwaters
(74) *Attorney, Agent, or Firm* — Hayes Soloway PC (57) ABSTRACT

Wind turbine blade having at least one longitudinal hollow element that defines an aerodynamic outer surface and an inner cavity having an inner surface. The blade also comprises at least one spar (1), disposed in the inner cavity and bonded to the inner surface by at least two bonding surfaces (13) located on bonding surfaces (2) of the spar (1). The spar (1) comprises, on at least one bonding zone (2), at least three fibre fabric layers (3) and at least one central core (4) and at least one lateral core (5) disposed between the at least three fibre fabric layers (3). This makes it possible to increase the resistance to shear stresses in the adhesive bond of the spar (1) to the inner surface of the longitudinal hollow element and decrease the required amount of adhesive.

6 Claims, 6 Drawing Sheets

BLADE FOR A WIND TURBINE

OBJECT OF THE INVENTION

The present invention falls within the technical field of wind turbines. More specifically, it disclosed a wind turbine blade having an enhanced bond between the shear web and inner surface of the blade.

BACKGROUND OF THE INVENTION

In general, wind turbine blades have a pressure surface and a suction surface consisting of laminated composite material joined therebetween and which confer the aerodynamic geometry to the blade. The connection of the pressure and suction surfaces is performed joining their ends and by means of shear webs disposed in the cavity formed by said pressure and suction surfaces. The shear webs stiffen the pressure and suction surfaces to avoid bending of the laminates that form them. The connection between the shear webs and pressure and suction surfaces can be executed in various manners, but the most common is bonding by means of adhesive.

In some cases, the blades are formed by a continuous surface, there not existing a bond defined between the pressure and suction surfaces. Also in these cases, the shear webs stiffen said pressure and suction surfaces and the bond between those and these is usually executed by means of adhesive.

The conventional geometry of the shear webs is I- or C-shaped, although shear webs having L- or T-shaped and even X- or K-shaped geometries are also known. The selection of one type of geometry or another depends on the structural requirements in terms of capacity to transmit the shear stress experienced by the blade due to aerodynamic loads and other solicitations arising during wind turbine operation. This shear stress is transmitted from the shear webs to the pressure and suction surfaces through the bond thereof which, as described previously, is usually an adhesive bond.

The shear webs comprise:
a central zone formed by at least one core and at least two fibre fabric layers disposed on both sides of the central core, and
two bonding zones on both ends of the central zone formed by a continuation of the core fibres.

Usually, the central zone of the shear web is disposed substantially transversely or obliquely to the blade pressure and suction surfaces. The shear web bonding zones allow adhesive bonding to the blade pressure and suction surfaces and comprise at least one bonding surface substantially parallel to said blade pressure and suction surfaces.

In this manner, each fibre fabric layer of the core forms a shear stress transmission layer such that the shear web usually comprises two layers. As the shear stress must be absorbed by the fibre fabric layers, the distribution of shear stress in the adhesive is not even, generating two shear stress tension peaks corresponding to each of the fibre fabric layers.

This makes it necessary, when using shear webs having a C-shaped geometry, to increase the width of the bond for the purpose of reducing the tension borne by the adhesive. However, this increase in width implies an increased in the use of adhesive material.

DESCRIPTION OF THE INVENTION

The present invention describes a wind turbine blade having at least one shear web configured to enhance the adhesive bonding thereof to the inner surface of the longitudinal hollow element of the blade. The shear web makes it possible, due to a more homogeneous distribution of shear stress in said bond, to reduce the width of said adhesive bond and enhance the transfer of shear stress between the inner surface of the longitudinal hollow element and the shear web itself. This in turn makes it possible to use less adhesive material.

Therefore, the blade of the present invention makes it possible to even out the distribution of shear stress in the adhesive bonding zone between the inner surface of the longitudinal hollow element and the shear web, minimising in turn the peak values of said stress.

The proposed blade comprises at least one longitudinal hollow element that defines an aerodynamic outer surface with a pressure zone and a suction zone, and an inner cavity having an inner surface which, in turn, has a zone corresponding to the pressure zone and a zone corresponding to the suction zone. And the blade comprises at least one shear web disposed in the inner cavity and joined to the inner surface by at least two bonding surfaces disposed in the shear web bonding zones.

In order to achieve the described objectives, the shear web of the blade of the present invention comprises, in the shear web bonding zones, which are preferably joined to the inner surface by means of an adhesive bond, a larger number of fibre fabric layers than the shear webs of the state of the art (it comprises at least three layers compared to two layers in the shear webs of the state of the art), separated therebetween by cores.

The fibre fabric layers which form the shear web stress transmission layers that transmit stress to the inner surface of the longitudinal hollow element are disposed parallel therebetween and transversely or obliquely with respect to the inner surfaces in the blade suction and pressure zones.

Although a larger number of fibre fabric layers and cores increases the number of shear tension peaks in the adhesive bond, the maximum values of these peaks are lower than with a smaller number of layers.

In this manner, enhanced transfer of the shear stress between the inner surface and the shear webs is achieved and the maximum shear stress magnitude in the bond is reduced with respect to the state of the art. The amount of fibre fabric used, which has a higher cost and density than the cores, is also optimised, and the width of the adhesive bond required to adequately transmit the stress is reduced.

In the blade described, the shear web has, in the adhesive bonding zone, at least three fibre fabric layers and a group of cores having at least two cores. The layout of the fibre layers with respect to the cores may depend on the loads of the blade in accordance with the type of wind to be supported, where it is installed, etc. This shear web configuration allows a more even distribution of the stress in the adhesive bond between the shear web and the inner surface of the longitudinal hollow element of the blade.

Specifically, the at least one shear web of the blade described comprises, in the adhesive bonding zone, a number of fibre fabric layers (i.e. shear stress transmission layers) equal to or greater than three. Said at least three layers are separated by at least two cores in the bonding zone of the shear web to the blade pressure and suction surfaces.

With respect to another type of shear webs known in the state of the art, in the bonding zone each of the cores of the present invention is disposed between at least two fibre fabric layers.

As already described, this configuration makes it possible to reduce the maximum shear stress magnitude in the bond between the shear webs and the blade pressure and suction surfaces. This also results in a reduction in the width of the shear web in the bonding zone (the bonding surface of the shear web is reduced), making it possible to save a large amount of adhesive and avoid the use of additional bonding and reinforcement elements external to the shear web itself.

Therefore, each shear web comprises a central core and at least one lateral core. The geometry of the lateral cores is such that, in the bonding zone, all the fibre fabric layers (i.e. all the stress transmission layers) are substantially parallel.

The at least one lateral core comprises an adjacent side, at least one side divergent with respect to, at least, one lateral side of the central core according to an angle of divergence.

The angle of divergence between the lateral surface of the lateral core and the lateral surface of the central core is less than or equal to 60°, preferably less than or equal to 30°. In a preferred embodiment, said angle of divergence remains constant throughout the shear web.

The at least one lateral core also comprises a lateral surface parallel to the lateral side of the central core and adjacent to the divergent side of the lateral core that extends between the divergent side and the bonding zone.

In one embodiment, the shear web has four layers such as to comprise a central core and two lateral cores on each side of the shear web bonding zone. In said bonding zone, each layer is separated from the adjacent layer by at least one core.

In one embodiment, the height of the shear webs varies from the zone next to the blade root, where they are higher, to the zone nearest the blade tip, where they are lower.

In one embodiment, the height of the lateral surface parallel to the lateral core in the zone opposite the central core is constant throughout the blade.

The height of the lateral cores is less than the height of the central core, in at least one zone of the shear web, said zone being disposed near the blade root.

In one embodiment, the thickness of the central core is greater than the thickness of the lateral cores.

The thickness of the central core decreases throughout the length of the shear web from the zone near the blade root towards the zone nearest the blade tip, where it is less thick. Likewise, the height of the shear webs varies from the zone near the blade root, where they are higher, to the zone nearest the blade tip, where they have thinner aerodynamic profiles and, therefore, the shear webs are lower in height.

Also, the thickness of the lateral cores increases throughout the length of the shear web, from the zone near the blade root towards the zone nearest the blade tip.

In addition, according to this embodiment, the thickness of the central core and of the lateral cores is such that the total length of the shear web, which is the sum of the thicknesses of the central core and of the lateral cores, is constant throughout the entire length of the shear web. This facilitates the blade manufacturing process and increases reliability, as it allows the distance between the adhesive lines of the adhesive bond to be constant throughout the entire length of the blade.

Each fibre fabric layer may be formed by one or more layers of fibre fabric, said fibre fabrics having different surface fibre content densities.

In one embodiment, the shear web is composed of a central zone and two bonding zones comprising four layers disposed parallel therebetween and obliquely with respect to the inner blade surface. Each of the layers is separated from the adjacent layer in said bonding zone by at least one core (made of PVC in one embodiment). Specifically, the central layers are separated therebetween by a central core and each layer is separated from the respective outer layers by a lateral core.

According to a particular embodiment wherein the number of layers is four, with two lateral layers and two central layers, the central layers comprise a greater number of fibre fabric layers than the lateral layers. In a preferred embodiment, in turn, the surface density of the fibre content in said fabric layers. According to one embodiment, the central layers comprise three fibre fabric layers of a density 50% greater than the fabric layers of the lateral layers.

In one embodiment, the height of the lateral layers in at least one shear web zone is substantially equal to the height of the central core.

In a preferred embodiment, the blade has two shear webs, a main shear web disposed near a zone of the leading edge and a shear web disposed near the zone of the trailing edge of the blade and, therefore, generally lower in height than the main shear web.

DESCRIPTION OF THE DRAWINGS

In order to complement the description being made and with the aim of helping to better understand the characteristics of the invention, in accordance with a preferred embodiment thereof, said description is accompanied, as an integral part thereof, by a set of drawings where, in an illustrative and non-limiting manner, the following has been represented:

FIG. 1b shows a graph representing the distribution of shear stress in the shear web of FIG. 1a;

FIG. 3b shows a graph representing the distribution of shear stress in the shear web of FIG. 3a;

PREFERRED EMBODIMENT OF THE INVENTION

Following is a description, with the help of FIGS. 1 to 6, of embodiments of the present invention.

Figure 1A:
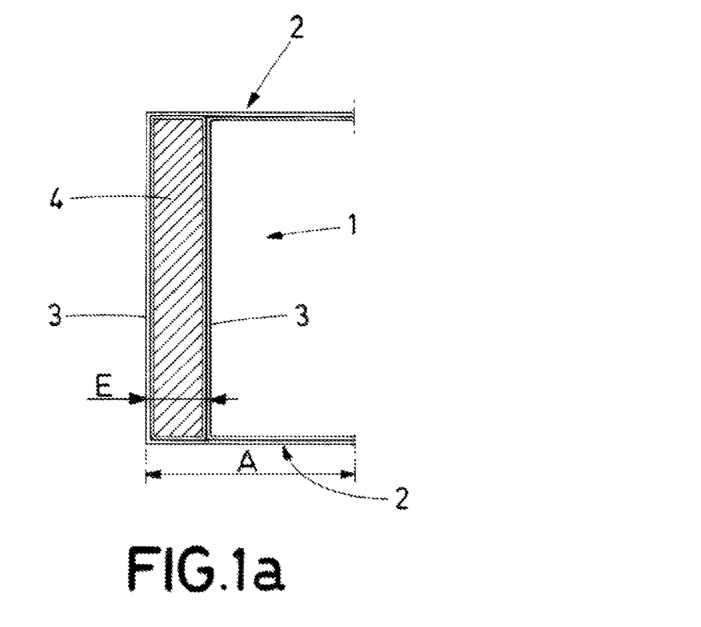
FIG. 1a shows a view of a shear web of the state of the art having a C-shaped configuration.

FIG. 1a shows an example of the shear web of the state of the art. In said figure the distribution of shear stress borne by the adhesive bond between the shear web and an inner surface of a longitudinal hollow element wherein said shear web is disposed has been represented. As described previously, the distribution of stress is such that two maximum stress peaks are generated. Said peaks correspond to the fibre fabric layers.

Figure 1B:
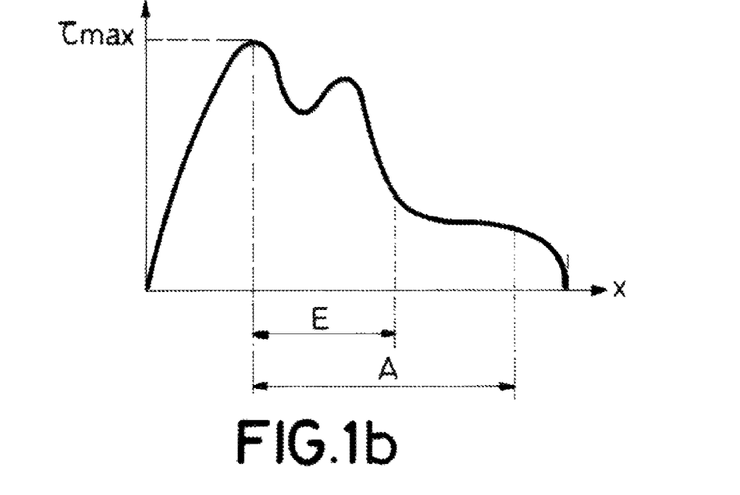

The central core (4) of the shear web (1) and the two fibre fabric layers (3) comprised by said shear web (1) have been represented in said figure. As can be observed in the figure, the fibre fabric layers (3) are disposed covering the two lateral sides of the central core (4) and also compose the bonding zone (2) of the shear web (1) that bonds with the inner side of the blade pressure and suction surfaces. As can be observed in the figure, the bonding zones (2) of the shear web (1) are formed by a single central core (4) and by the two fibre fabric layers (3). The thickness (E) of the central core (4) and a first width (A), which is the width of the adhesive bond with the inner side of the blade pressure and suction surfaces for a shear web (1) of the state of the art, are also indicated. FIG. 1b shows a graph representing the shear stress generated in the adhesive bond. As described previously, two shear stress peaks appear.

The present invention describes a wind turbine blade having a shear web that ensures a more homogeneous distribution of the shear stress in the adhesive bond between the shear web and the inner surface of the longitudinal hollow element.

The blade comprises at least one longitudinal hollow element that defines an outer aerodynamic surface and an inner cavity having an inner surface having a pressure zone and a suction zone; and comprises at least one shear web (1). Said shear web (1) is disposed in the inner cavity and is joined to the inner surface by at least two bonding surfaces (13) disposed in the shear web bonding zones (2).

The key of the present invention is that the shear web (1) comprises at least three fibre fabric layers (3) and at least one central core (4) and at least one lateral core (5) disposed between the at least three fibre fabric layers (3), disposed in at least one bonding zone (2).

In one embodiment, the at least three fibre fabric layers (3) are disposed parallel therebetween and transversely or obliquely with respect to the bonding surface (13) in the bonding zone near the bonding surface.

In one embodiment, the at least three fibre fabric layers (3) extend between the shear web bonding zones (2).

In one embodiment, each fibre fabric (3) layer is disposed on at least one side of the central core (4) or lateral core (5).

Figure 2:
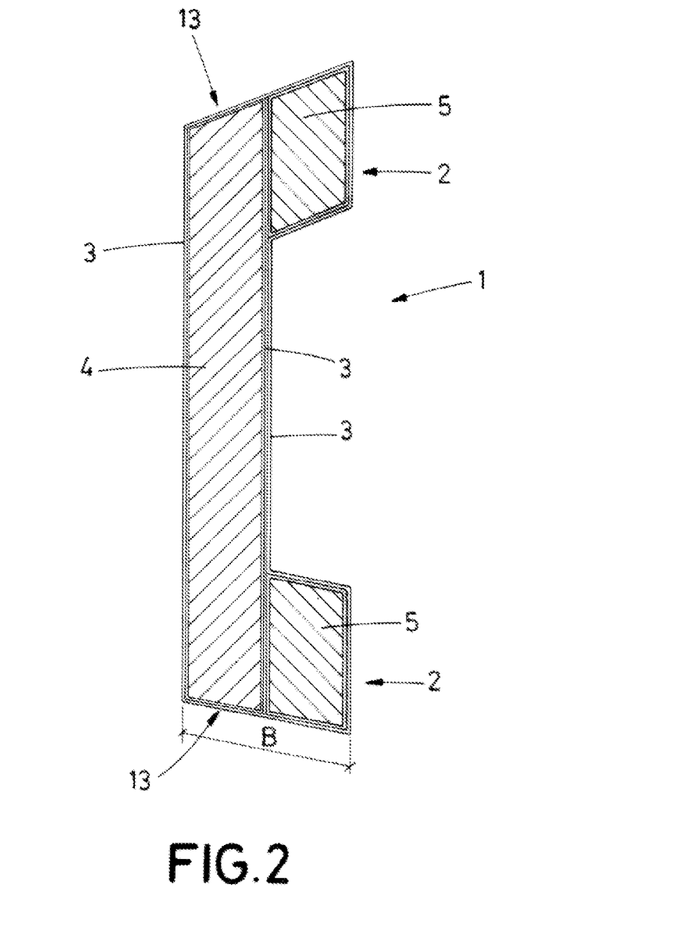
FIG. 2 shows a view of a shear web of the wind turbine blade of the present invention having a C-shaped configuration.

FIG. 2 shows an embodiment wherein the shear web (1) of a wind turbine blade of the present invention has been represented with a C-shaped configuration. In said figure, a second width (B), which is the width of the bonding surface (13) of the C-shaped shear web (1) of the present invention that bonds with the blade pressure and suction surfaces, is indicated. Said second width (B) is smaller than the first width (A) of the shear webs of the state of the art. This reduction in the width of the bonding surface (13) of the shear web (1) makes it possible to save on adhesive and, due to the distribution of the stress, the use of additional bonding elements or reinforcement elements external to the shear web itself are not required.

Figure 3A:
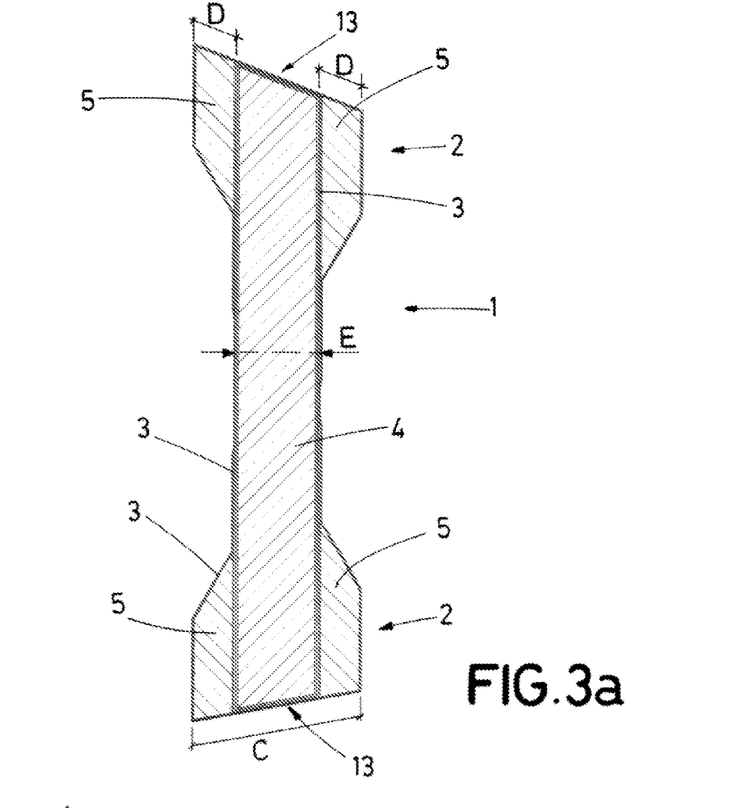
FIG. 3a shows a view of a shear web of the wind turbine blade of the present invention having a double T-shaped configuration.
Figure 3B:
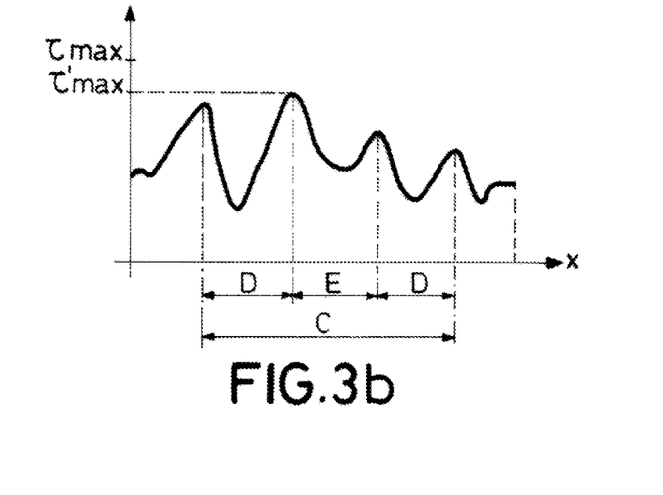

FIG. 3a shows an embodiment wherein the shear web (1) has a double T-shaped configuration. FIG. 3b shows a graph representing the distribution of shear stress on the bonding surface (13) between the shear webs (1). The graph shows the stress experienced throughout a third width (C) which is the width of the bonding surface (13) of the shear web (1) in this embodiment. As can be seen in graph 3b, in comparison with the graph of FIG. 1b, the shear stress is distributed more homogeneously and the value of the maximum shear stress peak has been reduced. In these figures it is also depicted the thickness (E) of the central core (4) and a thickness (D) of the lateral cores (5).

The at least three layers of fibre fabric (3) are separated by at least two cores (4, 5) in the bonding zone (2) of the shear web (1).

Figure 4:
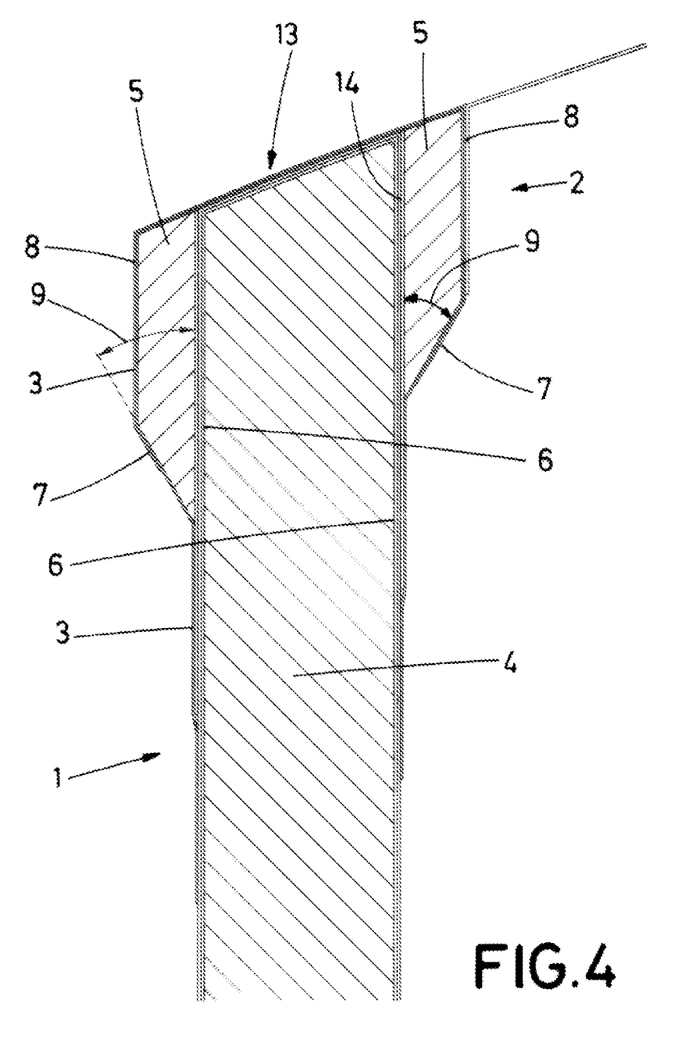
FIG. 4 shows a view wherein the cores and fibre layers of the shear web of the blade of the present invention can be observed.
Figure 5:
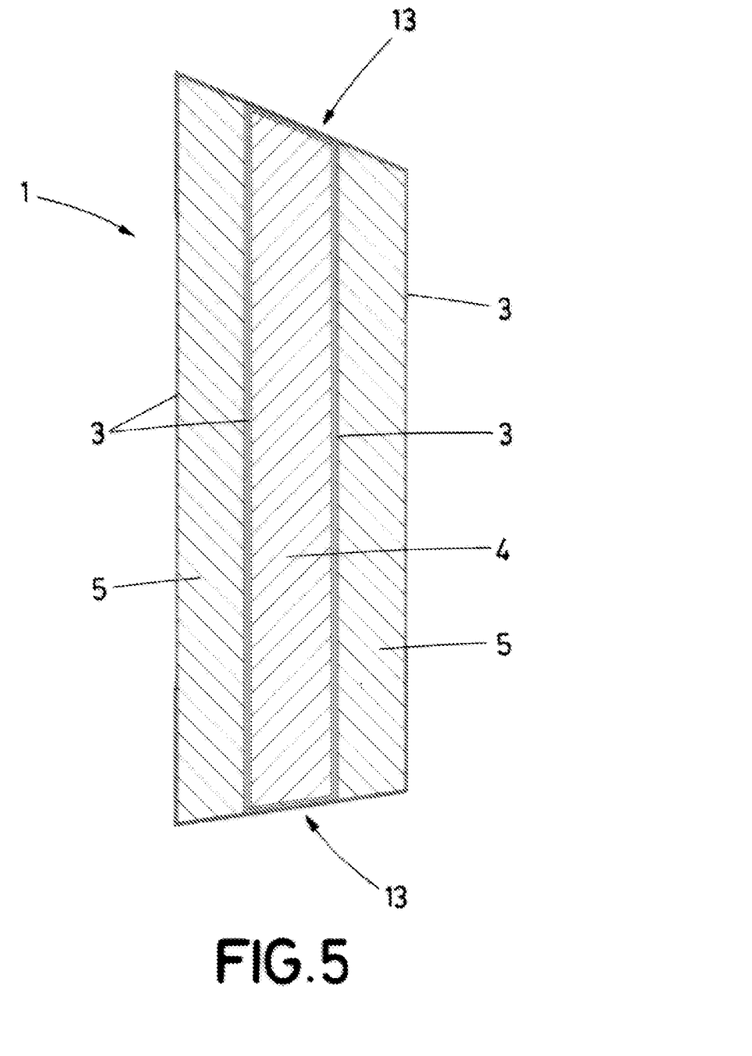
FIG. 5 shows a view of the shear web in the blade tip zone.

FIG. 4 shows the cores (4, 5) and fibre fabric layers (3) of the present invention. In this case, a zoom image of the bonding zone (2) is shown in order to represent the layout of the elements in this zone, which is the zone wherein the adhesive bond is executed, in detail. In this embodiment, a central core (4) and a lateral core (5) disposed on both sides of the central core (4) in the bonding zone (2) can be observed. The geometry of said lateral cores (5) is such that, in the bonding zone (2), all the fibre fabric layers (3) are substantially parallel. The bonding surface (13), which is the surface of the shear web (1) that is bonded to the inner surfaces of the longitudinal hollow element, has also been represented.

In one example of embodiment, such as that shown in FIG. 4, the lateral core (5) comprises an adjacent side (14) and at least one divergent side (7) that diverges from at least one of the lateral sides (6) of the central core (4) according to an angle of divergence (9). In one example of embodiment, said divergence (9) is less than or equal to 60°. Preferably, said angle of divergence (9) is less than or equal to 30°. In one embodiment, said angle of divergence remains constant throughout the shear web.

Likewise, the at least one central core (4) comprises at least two fibre fabric layers (3) disposed on at least part of one of the lateral sides (6). One of the fibre fabric layers (3) extends up to the bonding surface (13) directly on said lateral side (6) and the other fibre fabric layer (3) is also disposed on the divergent side (7) of the lateral core (5) such that at least two fibre fabric layers (3) are separated therebetween from the corresponding lateral side (6) up to the at least one bonding surface (13).

In one embodiment, the lateral core (5) also comprises a lateral surface (8) parallel to the lateral side (6) of the central core (4) and adjacent to the divergent side (7), which extends between the divergent side (7) and the bonding surface (13). Thus, according to this embodiment, one of the fibre fabric layers (3) extends up to the bonding surface (13) directly on the lateral side (6) of the central core and the other fibre fabric layer (3) is also disposed on the divergent side (7) of the lateral core (5) and on the parallel lateral surface (8), wherein the layer is prolonged up to the bonding surface. In this manner, the layer disposed on the lateral side (6) of the central core (4) and the layer disposed on the parallel lateral surface (8) are disposed parallel therebetween in the bonding zone near said bonding surface (13).

Preferably, the cores (4) are made of foam, PVC or balsa wood. Also preferably, the bond between the shear web (1) and the inner surface is executed by means of an adhesive bond.

In the example of embodiment shown in FIG. 4, the shear web (1) comprises four fibre fabric layers (3), a central core (4) and additionally comprises, in each shear web bonding zone (2), two lateral cores (5) disposed in such a manner that in the bonding zone (2), each fibre fabric layer (3) is separated from the adjacent layer by a core (4, 5). This configuration makes it possible for the shear stress and width value of the bonding surface reached in this four-layer configuration to be less than in the configuration of the state of the art: $\tau'_{Max} < \tau_{Max}$ and C<A, respectively, according to FIGS. 1a and 1b and 3a and 3b. This is also the case of the three-layer configuration of FIG. 2, the width of the adhesive bond B is smaller than the width A of FIG. 1 as a consequence of a lower shear value in said bond.

In one embodiment, at least the lateral surface (8) of the lateral core (5) has a constant height throughout the entire section of the shear web (1). In another embodiment, such as that shown in FIG. 5, the lateral cores (5) have a variable height throughout their length and said height varies in the same proportion as the height of the central core (4). This variation, preferably, decreases in height from the blade root zone to the blade tip zone. In one embodiment, the central core (4) and the lateral cores (5) extend between the two bonding surfaces (13) in at least one zone of the blade.

In one embodiment, the thickness of the central core (4) is greater than the thickness of the lateral cores (5). In another embodiment, the thickness of the central core (4) decreases throughout the length of the shear web (1) from the blade root zone to the blade tip zone and/or the thickness of the lateral cores (5) increases throughout the length of the shear web (1) from the blade root zone to the blade tip zone.

Preferably, the width of the shear web (1), which is the sum of the thicknesses of the central core (4) and of the lateral cores (5), is constant throughout its length.

Figure 6:
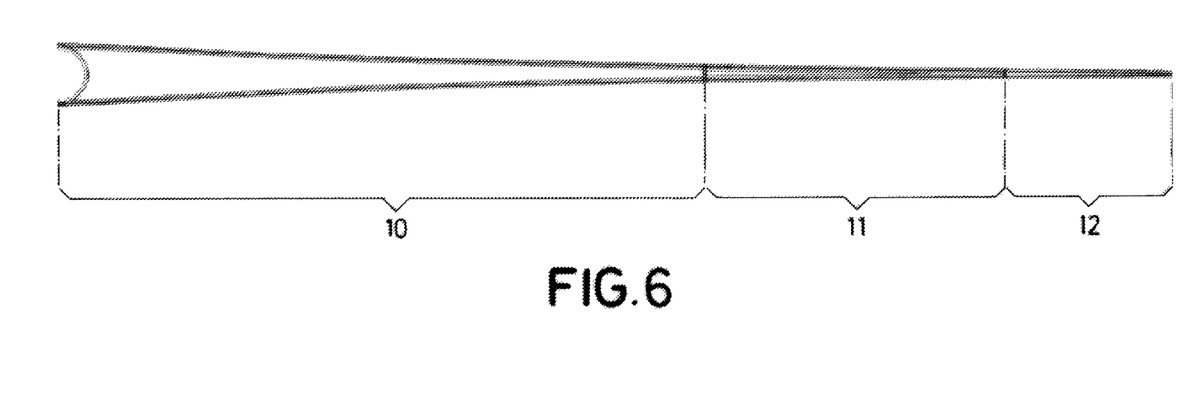
FIG. 6 shows a profile view of a blade wherein the different zones of the blade wherein the thickness of the central core differs are indicated.

FIG. 6 shows a blade and an embodiment wherein three sections are distinguished (10, 11, 12) wherein the thickness of the central core (4) differs while the width of the shear web remains constant throughout its entire length. In this case, the thickness of the central core (4) is smaller the nearer the section to the blade tip zone and, in order to maintain a constant shear web width, the thickness of the lateral cores (5) increases throughout the length of the shear web (1) from the blade root zone to the blade tip zone. In the figure, a first section (10) has been represented in the zone nearest the blade root, a second section (11) in the intermediate zone of the blade and a third section (12) in the zone of the blade tip.

In one embodiment, as shown in FIG. 2, the central core (4) extends between the two bonding surfaces (13) and comprises two lateral cores (5), each of which disposed near the central core (4) in each bonding zone (2). In another embodiment, as shown in FIG. 3a, the central core (4) extends between the two bonding surfaces (13) and comprises four lateral cores, two of which are disposed on the sides of the central core (4) in each bonding zone (2).

The invention claimed is:

1. A wind turbine blade comprising:
    at least one longitudinal hollow element that defines:
        an external aerodynamic surface, and
        an inner cavity having an inner surface in which there are a pressure zone and a suction zone,
        at least one shear web, disposed in the inner cavity and bonded to the inner surface in at least two bonding surfaces disposed in bonding zones of the shear web,
    and wherein the shear web comprises, in at least one bonding zone:
    at least three fiber fabric layers, and
    at least one central core and at least one lateral core disposed between the at least three fiber fabric layers; characterized in that:
    the at least one lateral core comprises an adjacent side and at least one divergent side with respect to, at least, one lateral side of the at least one central core according to an angle of divergence,
    the at least one central core comprises at least two fiber fabric layers disposed on at least part of one of the lateral sides, wherein one of the fiber fabric layers extends up to the bonding surface directly on said lateral side and another of the fiber fabric layers is disposed on the divergent side of the lateral core, such that the at least two fiber fabric layers are separated therebetween from the corresponding lateral side of the central core up to the at least one bonding surface, and
    the lateral core also comprises a lateral surface parallel to the lateral side of the central core and adjacent to the divergent side.

2. The wind turbine blade, according to claim 1, characterized in that the angle of divergence is less than or equal to 60°.

3. The wind turbine blade, according to claim 1, characterized in that the angle of divergence is less than or equal to 30°.

4. The wind turbine blade, according to claim 1, characterized in that the lateral surface of the lateral core has a constant height entirely throughout the shear web.

5. A wind turbine blade comprising:
    at least one longitudinal hollow element that defines:
    an external aerodynamic surface, and
    an inner cavity having an inner surface in which there are a pressure zone and a suction zone,
    at least one shear web, disposed in the inner cavity and bonded to the inner surface in at least two bonding surfaces disposed in bonding zones of the shear web, and wherein the shear web comprises, in at least one bonding zone:
    at least three fiber fabric layers, and
    at least one central core and at least one lateral core disposed between the at least three fiber fabric layers, characterized in that a thickness of the lateral cores increases throughout a length of the shear web from a blade root zone to a blade tip zone.

6. The wind turbine blade, according to claim 5, characterized in that a width of the shear web, which is a sum of a thicknesses of the central core and the thickness of the lateral cores, is constant throughout the length of the shear web and the thickness of the central core decreases throughout the length of the shear web from the blade root zone to the blade tip zone.

* * * * *